July 7, 1925.                                                                1,545,107
F. J. KURTZ
PANEL AND DOOR CONSTRUCTION FOR AUTOMOBILE TOPS
Filed April 14, 1922          2 Sheets-Sheet 1

Inventor
Frank J. Kurtz
By Silas L. Sweek
Atty.

July 7, 1925. 1,545,107
F. J. KURTZ
PANEL AND DOOR CONSTRUCTION FOR AUTOMOBILE TOPS
Filed April 14, 1922   2 Sheets-Sheet 2
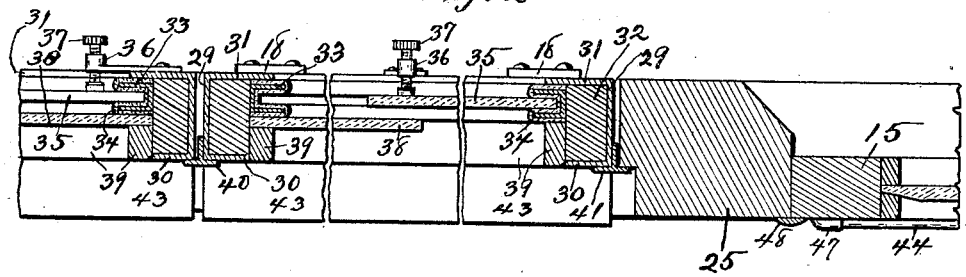
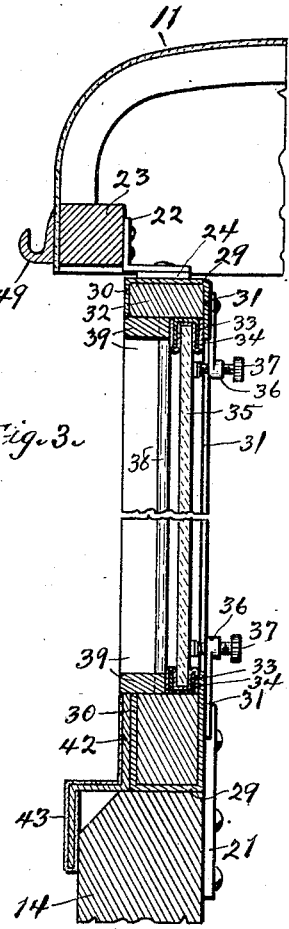
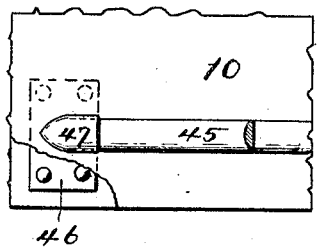
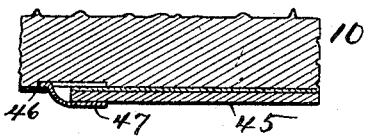
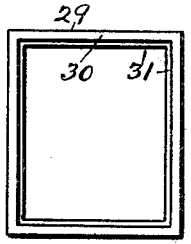
Inventor
Frank J. Kurtz
By Silas Sweet
Atty.

Patented July 7, 1925.

1,545,107

UNITED STATES PATENT OFFICE.

FRANK J. KURTZ, OF MARSHALLTOWN, IOWA.

PANEL AND DOOR CONSTRUCTION FOR AUTOMOBILE TOPS.

Application filed April 14, 1922. Serial No. 552,674.

*To all whom it may concern:*

Be it known that I, FRANK J. KURTZ, a citizen of the United States of America, and resident of Marshalltown, Marshall County, Iowa, have invented a new and useful Panel and Door Construction for Automobile Tops, of which the following is a specification.

An object of this invention is to provide improved means for closing the sides of an automobile top.

A further object of this invention is to provide an improved glazed panel adapted to be interposed between an automobile top and a side of an automobile body, which panel is adapted to be fixed to both the top and body.

A further object of this invention is to provide a glazed panel adapted to be mounted on an automobile door and be moved to and fro therewith, which panel also is adapted to be hinged to the automobile top and close the space between said door and top.

A further object of this invention is to provide an improved panel adapted to be employed in closing the space between an automobile body and top.

A further object of this invention is to provide an improved gutter adapted to be mounted on an automobile top above the closing panels thereof and accumulate and shed rain above and at the rear of said panels.

A further object of this invention is to provide improved means for closing the joints between panels employed in an automobile top.

A further object of this invention is to provide improved means for mounting and retaining sheets of glass in a panel employed in an automobile top.

A further object of this invention is to provide an improved apron or skirt member adapted to close the joint between a panel and automobile body or door.

A further object of this invention is to provide an improved trim for automobile tops.

My invention consists in the construction, arrangement and combination of elements hereinafter set forth, pointed out in my claims and illustrated by the accompanying drawing, in which—

Figure 1:
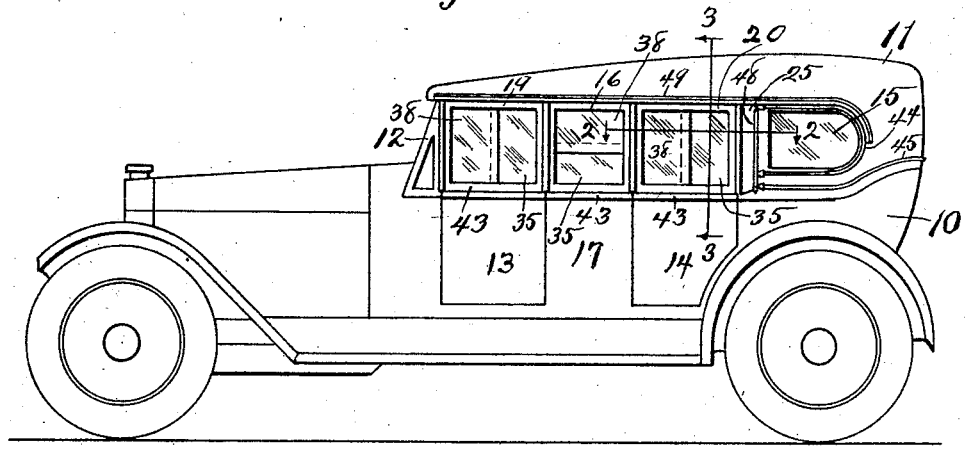
Figure 4:
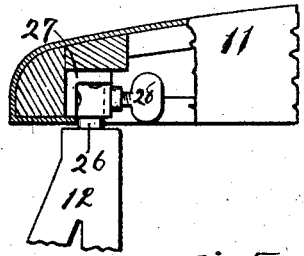
Figure 5:
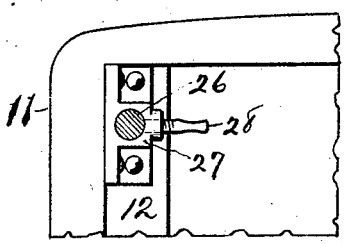
Figure 6:
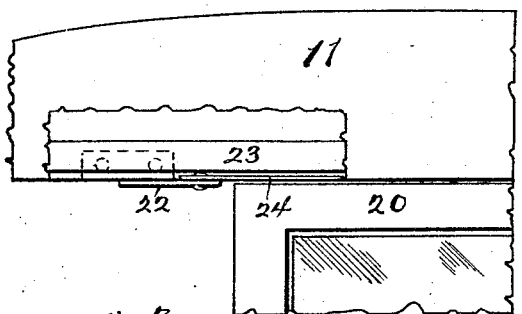
Figure 7:
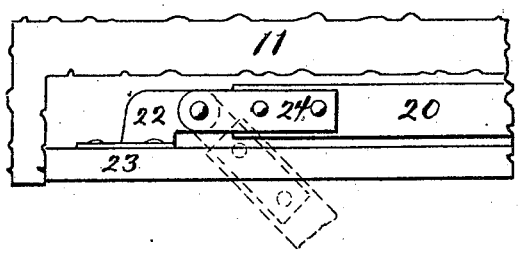

Figure 1 is a side elevation of an automobile on which my improved devices are mounted. Figure 2 is a horizontal section on an enlarged scale on the indicated line 2—2 of Figure 1. Figure 3 is a vertical section on an enlarged scale on the indicated line 3—3 of Figure 1. Figures 4 and 5 are detail views illustrating means employed to connect the front end of an automobile top to a windshield frame. Figures 6 and 7 are detail views illustrating one means employed to hinge a glazed door panel to an automobile top. Figures 8 and 9 are detail views illustrating the construction and mounting of trimming elements. Figure 10 is an elevation of a panel frame.

In the construction and mounting of the devices as shown the numeral 10 designates generally an automobile of touring type, 11 a top mounted thereon, 12 a windshield frame carried by the body of the automobile and adapted to support the front end of the top 11, and 13, 14 front and rear doors on the left side of the automobile body, similar doors (not shown) being presumed to be located opposite thereto in the right side of said body. The frame and deck of the automobile top 11 herein shown are illustrated and described in detail in my companion application pending concurrently herewith and the other parts above mentioned are shown conventionally as a vehicle for the improvements hereinafter described. The automobile 10, having a top 11, windshield and doors may be operated and used without the panels hereinafter described and in the event of such use would be styled an open car. My improvements relate particularly to the transforming of such open car into a closed car by the addition of glazed panels which are preferably eight in number, being arranged in sets of four on opposite sides of the body. The description will generally be confined to the panels exhibited in Figure 1 but it is to be understood that counterparts thereof are arranged on the opposite side of the car body.

In the rear portion of the side of the top there is a space having a curved rear end portion and a straight forward portion formed in the construction of said top and in said space a glazed panel 15 is mounted. This panel may be secured to the top frame in any suitable manner and generally is not removed or replaced but serves as a protection at the side of the tonneau, although it can be removed if desired. A glazed panel 16 is mounted on and rises from a side portion 17 of the body between the doors 13, 14 and said panel also is fixed to the top frame. The glazed panel 16 preferably is secured to the body frame and top frame by toe clips 18 of any suitable construction and bridges the space between the body portion 17 and top and extends from one to the other of the door openings in the side. Similar glazed panels 19, 20 are fixed to the doors 13, 14 and rising therefrom bridge the spaces between said doors and the top, said panels being secured to the doors preferably by toe clips 21. The respective panels 19, 20 are hinged to the top frame and the hinges employed for such purpose may vary in form and construction to accommodate them to the inclination of axes of the door hinges. In Figures 6 and 7 a hinge connection between the panel 20 and top frame is shown in elevation and plan respectively. One member 22 of the hinge employed is fixed to a top bow 23 and is made angular so as to present one portion for attachment to the top bow and one portion extended parallel to the top bow and offset relative to the first portion, and another member 24 which is plane and flat and adapted to be fixed to the frame of the panel 20 and pivoted to the extended portion. It is the function of the hinge connection between the upper ends of the panels and top frame to steady and support the panels auxiliary to the fastening thereof to the doors. It sometimes occurs that the forward margin of the panel 15 is curved or irregular in shape and it is desirable that the rear margin of the panel 20 be straight; therefore a filling block 25 is arranged vertically and interposed between said panels, the rear margin of the filling block conforming to the forward margin of the panel 15 and the forward margin of the filling block conforming to the rear margin of the panel 20. The windshield frame 12 preferably is formed with two posts rising from its opposite ends and said posts are adapted to be inserted in holes in clips 27 mounted in the top frame and be secured therein by set screws 28. The panel 19 preferably extends across the space between the panel 16 and windshield frame 12.

The general construction of each of the panels is alike although they may vary in size and arrangement of glass therein, and is as follows: The foundation of each panel is a steel frame 29 (Figure 10) and it is formed of a channel bar bent to enclose a square, its flanges projecting inwardly and its ends and angles connected to produce a rigid structure. One flange 30 of the frame is of less width than the flange 31 opposite thereto and wooden strips 32, four in number, are mounted in the channel thus formed and secured to the frame. The strips 32 are of such thickness that their inner margins are flush with the inner margin of the flange 30. Channel frames 33, of materially less width, thickness and weight, are lined with fabric 34 and mounted in the space bounded by the wooden strips 32 and abut the inner faces of the projecting portions of the flange 31. The frames 33 are fixed to the wooden strips 32 and compass substantially one-half the thickness of the panel frame 29. A sheet 35 of glass is mounted in the frame 33 and cushioned by the fabric lining 34. This sheet of glass is of less width than length and therefore of less width than the net opening of the frame 33 and is adapted to be moved to and fro in said frame manually. A locking device for the glass sheet 35 is provided as follows: Clips 36 are mounted on opposite sides of the flange 31 and cushioned set screws 37 are threaded in said clips and adapted to bear on the sheet 35 and hold it in any position in which it may be placed manually. A sheet 38 of glass is mounted in the space bounded by three of the wooden strips 32 and abuts the lined adjacent face of the frame 33. The sheet 38 of glass is of less width than length and overlaps in width the sheet 35 and is held in any given position by stops 39 mounted in the frame and fixed to the strips 32. The outer portions of the stops 39 extend across the inner margins of the flanges 30 of the panel frame and have their outer margins substantially flush therewith. The sheets 35 and 38 may be arranged either horizontally or vertically and overlap in such manner as to shed rain and to a major degree exclude drafts of air from the interior of the car when said car is stationary or driven in its normal forward direction. Either of the sheets 35 may be adjusted manually as described to provide ventilation or afford communication between persons within and outside the car without opening a door. Strips 40, 41 of metal, T-shaped in cross-section, are fixed to opposite side margins of the panel frames 29 of the door panels preferably by screws (not shown) extended through the stems of the strips and into the frame and adjacent strips 32. One flange of the head of each strip 40, 41 overlaps the outer surface of the flange 30 while the other flange of said head overlaps the flange 30 of an adjacent member, such as the filling block 25, flange 30 of the frame of the panel 16, or the windshield frame 12, according to location. The T-strips 40, 41 are arranged vertically and fill or overlie the joints between the door panels 19, 20 and adjacent panels or structural elements. The head portions of the T-strips 40, 41 also serve as an ornamental trim at the sides of the panels. An apron or skirt 42 of metal substantially ⌐-shaped in cross-section is provided for and adapted to be secured to each panel 16, 19 and 20. Each apron or skirt is lined with a sheet of substance such as fabric 43 and the upper flange thereof overlies and is fixed to the lower horizontal flange 30 of a panel frame 29. The lower flange of each strip overlaps and is fixed to the next adjacent element below it, which may be a door 13 or 14 or the portion 17 of the body, the integral bar connecting the upper and lower flanges offsetting the lower relative to the upper and compensating for the different planes of the parts as well as covering the joint between the panel and supporting element. The several apron or skirt strips are in alinement and closely related to each other at their ends, thus forming a substantially continuous skirting for the series of glazed panels in front of the filling block 25. A trimming element 44 is mounted as a border to the glazed panel 15 and another trimming element 45 is mounted as a trim parallel with the joint between that portion of the top and body at the rear of the doors 14. These trimming elements preferably are made of relatively thin strips of rattan flat on their inner surfaces and convex on their outer surfaces and the same are secured to the supporting elements in any suitable manner as by nails or screws, not shown. The end portions of the trimming elements 44, 45 are confined by clips 46, each clip having a concaved boss 47 adapted to receive an end portion and being provided with means for fastening to the supporting element as illustrated in detail in Figures 8 and 9. A similar trimming element 48 is shown in Figure 1 overlying the joint between the filling block 25 and adjacent end portion of the glazed panel 15. These trimming elements may be used as desired and in different locations where they will cover joints or serve as ornaments to the structure. A metal gutter 49 is mounted on the top above and in close proximity to the upper margins of the glazed panels 15, 16, 19 and 20. The gutter 49 is open at both ends, its forward end portion projects slightly in front of the door panel 19 and its rear end portion is curved downwardly and follows the contour of and is in close proximity to the trimming element 44 which embraces the glazed panel 15. It is the function of the gutters 49, one on each side of the top, to receive rain water draining laterally from the top or precipitated directly therein, and deposit the same at either end dependent on the inclination of the gutters at any given time due to the position of the vehicle on which they are mounted. Owing to the function above described, the gutters divert a considerable amount of water that might otherwise seep through the joints between the glazed panels 15, 16, 19 and 20 and the cover of the top or which might run down the glass and obscure the vision therethrough.

I claim as my invention—

1. In a device of the class described, a panel frame of angular form constructed of a rigid channel bar having its flanges directed inwardly, one flange being of less width than the other, wooden strips contained within the channel of said bar, a lesser frame made of a channel bar and mounted within and contacting said strips, said lesser frame being adjacent the inner projecting portion of the wider flange of the primary frame, a transparent plate slidingly mounted in said lesser frame, a transparent plate mounted adjacent to the lesser frame and overlapping the first transparent plate, and retaining devices mounted on the wooden strips and engaging the latter transparent plate.

2. In a device of the class described, a panel frame constructed of a rigid channel bar having its flanges directed inwardly, one flange being of greater width than the other, a lesser frame mounted within said channel frame and contacting the wider flange thereof, a transparent plate slidingly mounted in said lesser frame, and a transparent plate mounted adjacent the lesser frame and overlapping the first transparent plate.

3. In a device of the class described, a panel frame of angular form constructed of a rigid channel bar having its flanges directed inwardly, one flange being of less width than the other, wooden strips contained within the channel of said bar, a lined lesser frame made of a channel bar and mounted within and contacting said strips, said lesser frame being adjacent the inner projecting portion of the wider flange of the primary frame, a transparent plate slidingly mounted in said lesser frame, a transparent plate mounted adjacent to the lesser frame and overlapping the first transparent plate, and retaining devices mounted on the wooden strips and engaging the latter transparent plate.

4. In a device of the class described, a panel frame of angular form adapted to be fixed to a support and surmounted by and fixed to a top, constructed of a rigid channel having its flanges directed inwardly, one flange being of less width than the other, wooden strips contained within the channel of said bar, a lesser frame made of a channel bar and mounted within and contacting said strips, said lesser frame being adjacent the inner projecting portion of the wider flange of the primary frame, a transparent plate slidingly mounted in said lesser frame, a transparent plate mounted adjacent to the lesser frame and overlapping the first transparent plate, and retaining devices mounted on the wooden strips and engaging the latter transparent plate.

5. In a device of the class described, a panel frame of angular form adapted to be fixed to a door and hinged to a top, constructed of a rigid channel bar having its flanges directed inwardly, one flange being of less width than the other, wooden strips contained within the channel of said bar, a lesser frame made of a channel bar and mounted within and contacting said strips, said lesser frame being adjacent the inner projecting portion of the wider flange of the primary frame, a transparent plate slidingly mounted in said lesser frame, a transparent plate mounted adjacent to the lesser frame and overlapping the first transparent plate, and retaining devices mounted on the wooden strips and engaging the latter transparent plate.

6. In an automobile having a body, a door hinged in the body and a top frame spaced from the body and substantially parallel therewith; a glazed panel fixed to the top of the door and adapted to substantially bridge the space between it and the top frame, and a hinge between the glazed panel and top frame, said hinge comprising a right-angled metal strip adapted to be fixed by one flange to the top frame and having a part of its other flange offset laterally from the first flange and its width and length in a plane substantially parallel with the lower surface of the top frame and its outer edge inwardly spaced from the inner surface of the top frame, and another metal strip adapted to rest on and be fixed to the top of the glazed panel, the latter strip projecting beyond one side margin of the glazed panel and overlapping the offset flange of the first strip at one end and pivoted thereto.

Signed at Des Moines, in the county of Polk and State of Iowa, this 8th day of February, 1922.

FRANK J. KURTZ.